US012374775B2

(12) United States Patent
Yousefbeiki

(10) Patent No.: US 12,374,775 B2
(45) Date of Patent: Jul. 29, 2025

(54) INSULATING GLAZING UNIT WITH ANTENNA UNIT

(71) Applicants: AGC GLASS EUROPE, Louvain-la-neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

(72) Inventor: Mohsen Yousefbeiki, Gosselies (BE)

(73) Assignees: AGC GLASS EUROPE, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 854 days.

(21) Appl. No.: 17/425,903

(22) PCT Filed: Jan. 31, 2020

(86) PCT No.: PCT/EP2020/052384
§ 371 (c)(1),
(2) Date: Jul. 26, 2021

(87) PCT Pub. No.: WO2020/157252
PCT Pub. Date: Aug. 6, 2020

(65) Prior Publication Data

US 2022/0166126 A1 May 26, 2022

(30) Foreign Application Priority Data

Jan. 31, 2019 (EP) .................................... 19154766

(51) Int. Cl.
*H01Q 1/12* (2006.01)
*E06B 3/663* (2006.01)
*H01Q 1/44* (2006.01)

(52) U.S. Cl.
CPC ....... *H01Q 1/1271* (2013.01); *E06B 3/66309* (2013.01); *H01Q 1/44* (2013.01); *E06B 2003/6638* (2013.01)

(58) Field of Classification Search
CPC ........ H01Q 1/1271; H01Q 1/44; H01Q 1/002; H01Q 1/007; H01Q 1/02; E06B 3/66309; E06B 2003/6638
See application file for complete search history.

(56) References Cited

U.S. PATENT DOCUMENTS 5,760,744 A * 6/1998 Sauer ................... H01Q 9/0407 343/700 MS
6,275,157 B1 * 8/2001 Mays ..................... G07C 5/085 340/572.5

(Continued)

FOREIGN PATENT DOCUMENTS

CN 110534868 B * 12/2021 ................ B60J 1/00
EP 1 559 167 A1 8/2005

(Continued)

OTHER PUBLICATIONS

International Search Report mailed on Mar. 20, 2020 in PCT/EP2020/052384 filed on Jan. 31, 2020.

*Primary Examiner* — Dameon E Levi
*Assistant Examiner* — Bamidele A Immanuel
(74) *Attorney, Agent, or Firm* — Oblon, McClelland, Maier & Neustadt, L.L.P.

(57) ABSTRACT

An insulating glazing unit extends along a plane, P, defined by a longitudinal axis, X, and a vertical axis, Z; having a width, W, measured along the longitudinal axis, X, and a length, L, measured along the vertical axis, Z, and includes (Continued)

a first glass pane that faces outside and has two major surfaces extending along a plane, P. A second glass pane faces inside and has two major surfaces extending along a plane, P. A spacer maintains a distance, D, between the first and second glass panes, creating a space, S. An antenna unit comprises an antenna and is fixed between the first and second glass panes with a fixing portion for fixing the antenna to one of the glass panes and maintaining the antenna at a distance, Da1, from the inner surface of the first glass pane to create a space, SI, through which gas can circulate.

10 Claims, 3 Drawing Sheets

(56) References Cited

U.S. PATENT DOCUMENTS

| | | | | |
|---|---|---|---|---|
| 6,313,796 | B1 * | 11/2001 | Potin | H01Q 23/00 343/700 MS |
| 10,797,373 | B2 * | 10/2020 | Hughes | E06B 3/6722 |
| 2006/0202897 | A1 | 9/2006 | Roquiny | |
| 2006/0202898 | A1 * | 9/2006 | Li | H01Q 1/1271 343/713 |
| 2008/0129499 | A1 * | 6/2008 | Masuzaka | G08B 13/04 340/545.1 |
| 2010/0231466 | A1 * | 9/2010 | Hisaeda | H01Q 1/40 343/873 |
| 2011/0279335 | A1 * | 11/2011 | Degen | B32B 17/10348 343/705 |
| 2012/0154229 | A1 * | 6/2012 | Kagaya | H01Q 13/10 343/713 |
| 2015/0244089 | A1 * | 8/2015 | Reul | H01R 43/00 156/182 |
| 2015/0357700 | A1 * | 12/2015 | Kagaya | H01Q 1/27 343/770 |
| 2016/0172765 | A1 | 6/2016 | Motta-Cruz et al. | |
| 2017/0317399 | A1 * | 11/2017 | Droste | H01Q 1/1278 |
| 2018/0037007 | A1 * | 2/2018 | Droste | B32B 17/10036 |
| 2019/0023610 | A1 * | 1/2019 | Fischer | C03C 17/3626 |
| 2019/0146019 | A1 * | 5/2019 | Effertz | G01R 27/26 340/657 |
| 2019/0152194 | A1 * | 5/2019 | Schmalbuch | B32B 17/10165 |
| 2019/0287358 | A1 * | 9/2019 | Effertz | G08B 13/04 |
| 2019/0383087 | A1 * | 12/2019 | Hermens | E06B 3/66352 |
| 2020/0161741 | A1 * | 5/2020 | Hiramatsu | H01Q 1/1271 |
| 2020/0408031 | A1 * | 12/2020 | Holtstiege | E06B 3/663 |

FOREIGN PATENT DOCUMENTS

| | | | |
|---|---|---|---|
| EP | 1 833 030 | A1 | 9/2007 |
| EP | 2 833 474 | A1 | 2/2015 |
| EP | 3 309 343 | A1 | 4/2018 |

* cited by examiner

INSULATING GLAZING UNIT WITH ANTENNA UNIT

TECHNICAL FIELD

The present invention relates to an insulating glazing unit with an improved antenna unit.

BACKGROUND ART

Various communication systems based on wireless technologies such as cellular communication, radio broadcasting, GPS (Global Positioning System) are being developed. In order to deal with these communication systems, an antenna capable of transmitting and receiving electromagnetic waves used for each communication system is required.

In recent years, with miniaturization, antennas are increasingly installed in buildings. A large number of antennas are installed in the building so that electromagnetic waves used for mobile communications can be transmitted and received in a stable manner. When installing the antenna in the building, it is necessary to select the proper placement of the antenna so that electromagnetic waves can be transmitted and received stably while preventing the appearance of the building from being impaired.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to install a larger number of antennas in order to stably perform electromagnetic wave transmission and reception.

As an antenna unit to be installed and used in a building, for example, there are three layers having different relative dielectric constants, each layer is set to a predetermined thickness, and a radio wave transmitting body as described in the patent application JP06196915.

However, according to the technique described in JP06196915, there is a case where the temperature of the first layer excessively rises when the sunlight hits the first layer, depending on the installation place or the installation condition of the antenna unit and the like, It has not been studied that there is a possibility of thermal cracking in the first layer of the permeable member.

An object of one embodiment of the present invention is to provide a glass antenna unit capable of reducing the possibility of occurrence of thermal cracking in a glass pane while protecting the antenna unit from external attack.

SUMMARY OF INVENTION

It is an object of the present invention to alleviate these problems, and to provide a glazing unit which allows radiation from the antenna unit with reduced distortion and back reflection from the glass pane while reducing the possibility of occurrence of thermal cracking in the glass pane and having high insulating performances with a discreet and protected antenna unit.

According to a first aspect of the invention, the invention relates to an improved insulating glazing unit extending along a plane, P, defined by a longitudinal axis, X, and a vertical axis, Z; having a width, W, measured along the longitudinal axis, X, and a length, L, measured along the vertical axis, Z comprising at least a first glass pane, facing outside having two majors surfaces extending along a plane, P, an outer surface and an inner surface, a second glass pane, facing inside having two majors surfaces extending along a plane, P, an outer surface and an inner surface facing to the inner surface of the first glass pane, a spacer, maintaining a distance, D, between the first glass pane and the second glass pane, creating a space S filled with gas, and at least one antenna unit comprising an antenna.

Outside is understood as facing the outdoor and the external environment (sun, wind, . . . ). Inside is understood as facing indoor and the internal environment.

The solution as defined in the first aspect of the present invention is based on the antenna unit fixed between the first glass pane and the second glass pane. The antenna unit further comprises a fixing portion for fixing the antenna to one of glass panes and for maintaining the antenna at a distance Da1 from the inner surface of the first glass pane to create a space S1 through which gas can circulate.

According to the invention, the antenna unit is maintained at a distance Da2 from the inner surface of the second glass pane to create a space S2 through which gas can circulate.

In some embodiments, the antenna unit comprises two metallic elements, one of the metallic element is placed over at least a part of one of the non-fixing portion and the other of the antenna unit and the other one of the metallic elements is placed over at least a part of the second non-fixing portion of the antenna unit.

In preferred embodiments, the first glass pane is at least partially covered by an insulating coating system. This insulating coating system improves the insulation capacity of the glazing and can minimize the local overheating near the antenna unit. Preferably, the insulating coating system is placed on the inner face of the first glass pane to be more efficient and protected from external conditions such as dust, rain, wind, . . . .

In a more preferred embodiment, the insulating coating system of the first glass pane has an opening in front of the antenna unit.

More preferably, the insulating coating system covers the major or the entire inner surface of the first glass pane.

In some preferred embodiments, the second glass pane is at least partially covered by a coating system and preferably by an insulating coating system. More preferably, an insulating coating system covers the major or the entire inner surface of the second glass pane. The coating system placed in the second glass pane can be placed on the inner surface and/or the outer surface of the second glass pane in order to optimize the insulation of the glazing unit.

Preferably, the insulating coating system of the second glass pane has an opening in front of the antenna unit In some embodiments, fixing portion of the antenna unit is fixed to the first glass pane.

In some other embodiments, fixing portion of the antenna unit is fixed to the second glass pane.

It is noted that the invention relates to all possible combinations of features recited in the claims.

The following description relates to an building window unit but it's understood that the invention may be applicable to others fields like transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
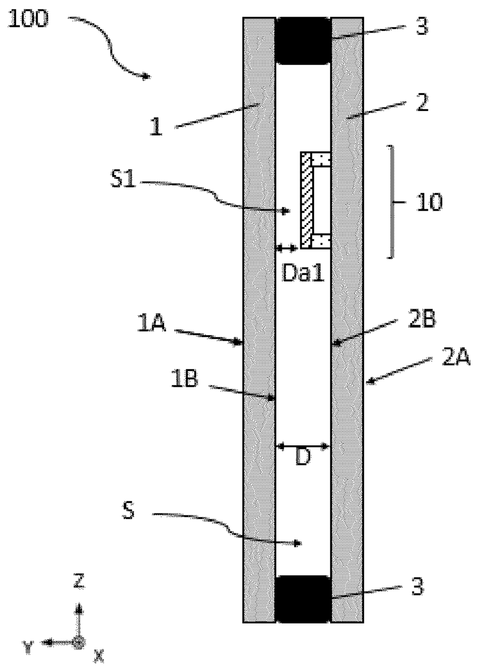
FIG. 1 is a schematic sectional view of an insulating glazing unit according to an exemplifying embodiment of the present invention.

For a better understanding, the scale of each member in the drawing may be different from the actual scale. In the present specification, a three-dimensional orthogonal coordinate system in three axial directions (X axis direction, Y axis direction, Z axis direction) is used, the width direction of the glass pane is defined as the X direction, the thickness direction is defined as the Y direction, and the height is defined as the Z direction. The direction from the bottom to the top of the glass pane is defined as the +Z axis direction, and the opposite direction is defined as the −Z axis direction. In the following description, the +Z axis direction is referred to as upward and the −Z axial direction may be referred to as down.

With reference to FIG. 1, a first embodiment of the present invention is described.

As shown in FIG. 1, an insulating glazing unit 100 extending along a plane, P, defined by a longitudinal axis, X, and a vertical axis, Z; having a width, W, measured along the longitudinal axis, X, and a length, L, measured along the vertical axis, Z, comprises a first glass pane (1), facing outside (+Y) having two majors surfaces extending along a plane, P, an outer surface (1A) and an inner surface (1B), a second glass pane (2) facing inside (−Y) having two majors surfaces extending along a plane, P, an outer surface (2A) and an inner surface (2B) facing to the inner surface (1A) of the first glass pane (1), a spacer (3), maintaining a distance, D, between the first glass pane and the second glass pane (2), creating a space S filled with gas; and an antenna unit (10) comprising an antenna (11). Then, sunlight or the like is irradiated on the outer surface (1A) of the first glass pane.

According to the invention, a third glass pane may be assembled to the insulating glazing unit.

In some embodiments, this third glass sheet can be laminated to the first glass sheet meaning that the third glass pane is assembled to the outer surface (1A) of the first glass pane with a plastic interlayer or the third glass sheet can be laminated to the second glass sheet meaning that the third glass pane is assembled to the outer surface (2A) of the second glass pane with a plastic interlayer to ensure safety, security and/or penetration resistance of the insulating glazing unit. The laminated glazing comprises glass panes maintained by one or more interlayers positioned between glass panes. The interlayers employed are typically polyvinyl butyral (PVB) or ethylene-vinyl acetate (EVA) for which the stiffness can be tuned. These interlayers keep the glass panes bonded together even when broken in such a way that they prevent the glass from breaking up into large sharp pieces.

In some other embodiments, the third glass pane can be assembled with a spacer to the first or the second glass pane, maintaining a certain distance between the third glass pane and the first glass pane or the second glass pane, and creating a space filled with gas to improve the insulation capacities of the insulating glazing unit.

In some embodiments, several glass sheets can be assembled to the insulating glazing unit to ensure the insulation and/or safety, . . . performances.

The glass pane (1, 2) is a known glass pane used for a window of a building or the like. The glass pane (1, 2) is formed in a rectangular shape in plan view and has a first main surface and a second main surface. The thickness of the glass pane (1, 2) is set according to requirements of buildings and the like.

In the present embodiment, the first main surface (1A) and the second main surface (2A) are collectively referred to simply as the main surface in some cases. In the present embodiment, the rectangle includes not only a rectangle or a square but also a shape obtained by chamfering corners of a rectangle or a square. The shape of the glass pane in a plan view is not limited to a rectangle, and may be a circle or the like.

As the material of glass panes, for example, soda-lime silica glass, borosilicate glass, or aluminosilicate glass can be mentioned.

Glass panes can independently be manufactured by a known manufacturing method such as a float method, a fusion method, a redraw method, a press molding method, or a pulling method. As a manufacturing method of glass panes, from the viewpoint of productivity and cost, it is preferable to use the float method.

Glass pane can be formed in a rectangular shape in a plan view by using a known cutting method. As a method of cutting glass panes, for example, a method in which laser light is irradiated on the surface of the glass pane (1, 2) to cut the irradiated region of the laser light on the surface of the glass pane (1, 2) to cut the glass pane (1, 2), or a method in which a cutter wheel is mechanically cutting can be used.

Glass sheets can be independently a clear glass or a coloured glass, tinted with a specific composition of the glass or by applying a coating or a plastic layer for example.

Figure 2:
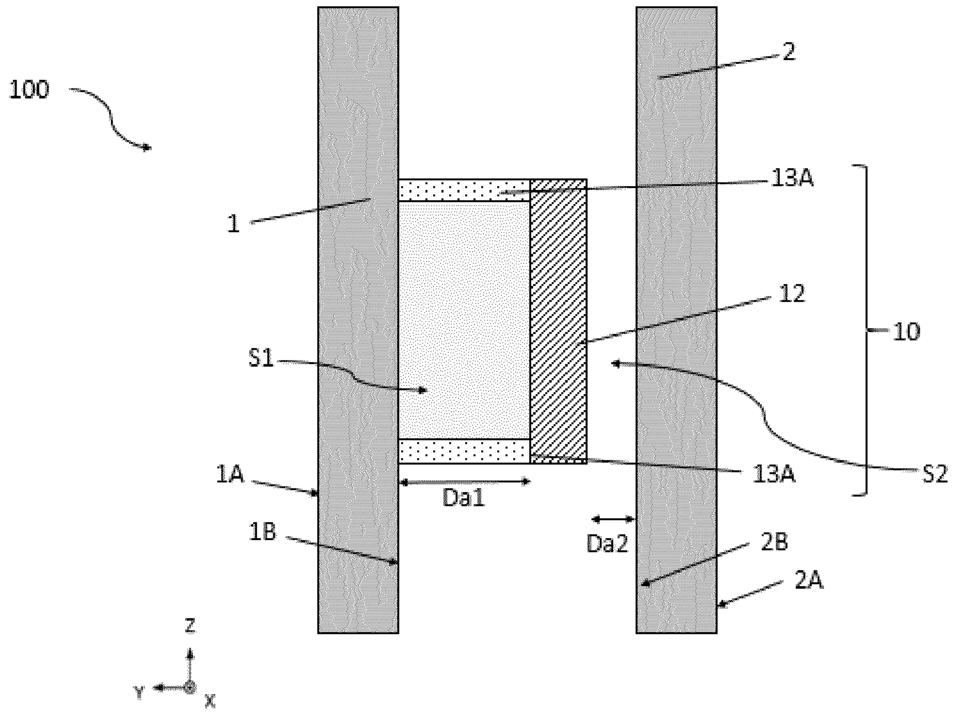
FIG. 2 is a schematic sectional view of an insulating glazing unit according to an exemplifying embodiment of the present invention where the antenna unit is fixed on the first glass pane.
Figure 4:
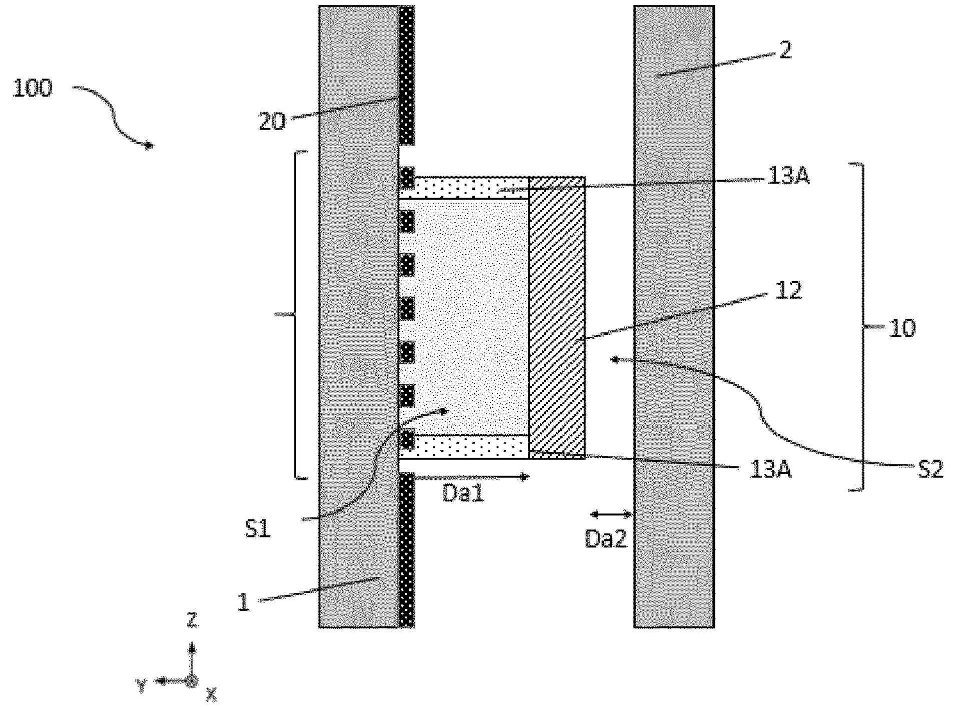
FIG. 4 is a schematic sectional view of an insulating glazing unit according to an exemplifying embodiment of the present invention where the antenna unit is fixed on the coated first glass pane.

As shown in FIG. 2 and FIG. 4, the antenna unit 10 comprises an antenna 12 and a fixing portion 13A fixing the antenna 12 to the first glass pane 1 and for maintaining the antenna at a distance Da1 from the inner surface 1B of the first glass pane 1 to create a space S1 through which gas can circulate. In some embodiments, when the length, measured in the Y axis corresponding to the distance Da1, of the fixing part added to the thickness, measured in the Y axis, of the antenna 12 is smaller than the distance D, a distance Da2 from the inner surface 2B of the second glass pane 2 is created, creating a space S2 through which gas can circulate.

Figure 3:
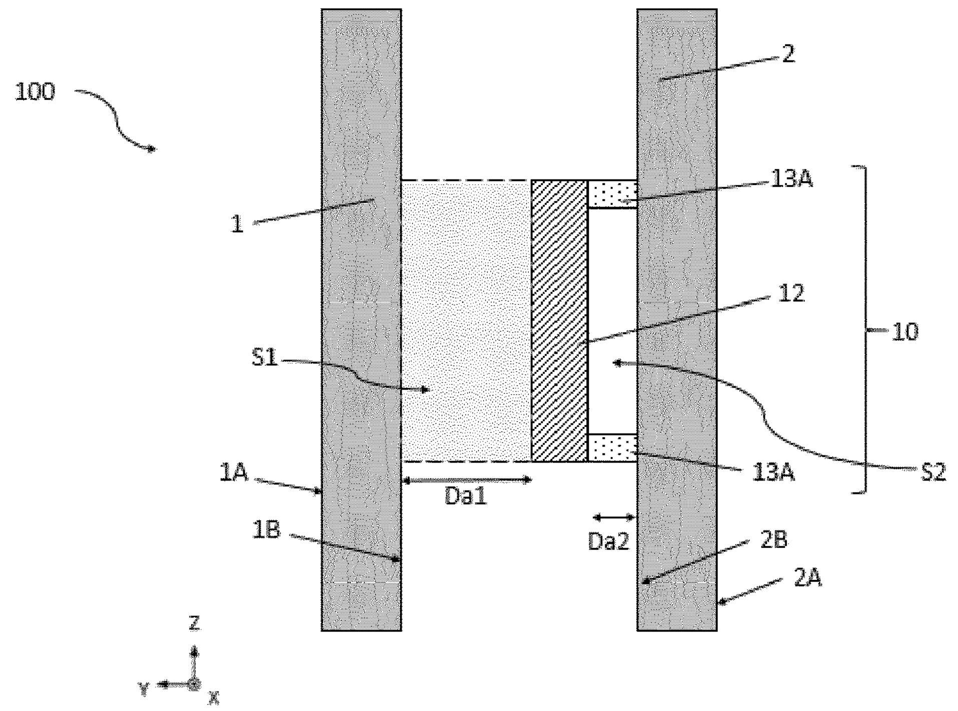
FIG. 3 is a schematic sectional view of an insulating glazing unit according to an exemplifying embodiment of the present invention where the antenna unit is fixed on the second glass pane.
Figure 5:
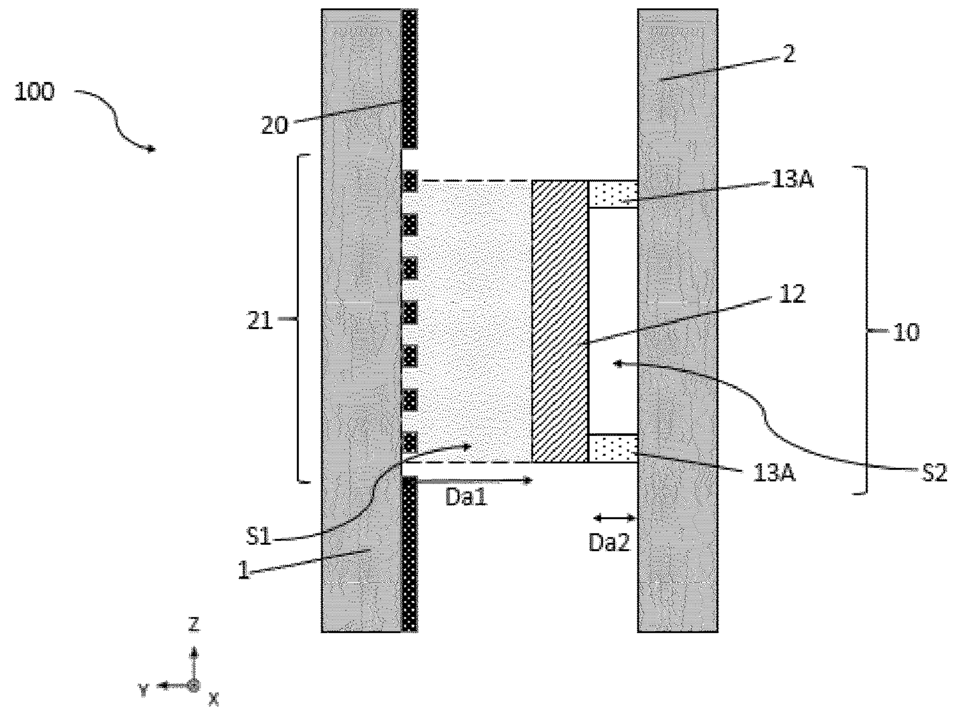
FIG. 5 is a schematic sectional view of an insulating glazing unit according to an exemplifying embodiment of the present invention where the antenna unit is fixed on the second glass pane with a coated first glass pane.

As shown in FIG. 3 and FIG. 5, the antenna unit 10 comprises an antenna 12 and a fixing portion 13A fixing the antenna 12 to the second glass pane 2 and for maintaining the antenna at a distance Da1 from the inner surface 1B of the first glass pane 1 to create a space S1 through which gas can circulate. A distance Da2, corresponding to the thickness, measured in the Y axis, of the fixing part creates a space S2 through which gas can circulate.

The fixing portion 13A is for forming at least a space S1 through which gas can flow between the first glass pane 1 and the antenna 12 and is for fixing the antenna 12 to one of the first or second glass pane (1, 2). The fixing portion 13A is attached to the first main surface of the antenna 12. In the present embodiment, the fixing portion 13A is provided in a rectangular shape along the Z-axis direction at both ends in the X-axis direction of the antenna installation substrate. In the present embodiment, the reason why the space S1 through which gas flows is formed between the first glass pane 1 and the antenna 12 is that the local temperature of the surface temperature of the glass pane (1, 2) at the position facing the antenna 12. When the outer main surface 1A of the first glass pane 1 is irradiated with sunlight, the first glass pane 1 and the insulating glazing unit 100 is heated. At this time, if the flow of gas is blocked in the vicinity of the antenna unit 10, the temperature of the antenna unit 10 rises, so that the temperature of the surface of the glass pane (1, 2) to which the antenna unit 10 is attached or at least the inner surface of the first glass sheet is higher than the temperature of the other surface The temperature tends to rise more easily. In order to suppress this temperature rise, a space S1 is formed between the first glass pane 1 and the antenna 12. Details regarding this point will be described later.

The material for forming the fixing portion 13A is not particularly limited as long as it can be fixed to the contact surface of the antenna 12 and the glass pane (1, 2). For example, an adhesive or an elastic seal can be used. Materials for forming adhesives and sealing materials.

In some embodiments, the antenna 12 is fixed on the second glass pane 2. In these embodiments, the fixing portion 13A of the antenna unit may be a plastic interlayer, a glue or any layer, or assembly of layers able to maintain the antenna 12 on the inner surface of the second glass pane 2. In these embodiments, there is no space S2 between the antenna and the surface of the second glass sheet. The largest space S1 is created allows to reduce the local overheat of the first glass pane.

In some embodiments, the average thickness Da1 of the fixing portion 13A is preferably 0.5 mm to 20 mm. If the average thickness Da1 is too small, the thickness of the space S1 formed by the antenna 12 and the glass pane 1 becomes small (thin), and the gas does not smoothly flow through the space S1. By making the space S1 between the antenna 12 and the glass pane 1 slight, the thickness of the space S1 becomes thin, but the space S1 can function as a heat insulating layer. Even if the thickness of the space S1 is small, a certain amount of gas flows. That is, when sunlight is irradiated on the first glass pane 1, the temperature of the glass pane 1 rises, and the temperature of the gas in the space S1 also rises. As the temperature of the gas rises, the gas expands more, so that the upper gas in the space S1 rises and flows out from the upper side of the space S1 to the outside of this space to the space S. Then, the gas sequentially rises from the lower side in the space S1. Therefore, even when the thickness of the space S1 is small, the gas tends to flow as the temperature of the gas in the space S rises.

Preferably, when a space S2 exists, the average thickness Da2 of the fixing portion 13A is preferably 0.5 mm to 20 mm. If the average thickness Da2 is too small, the thickness of the space S2 formed by the antenna 12 and the glass pane 2 becomes small (thin), and the gas does not smoothly flow through the space S2, keeping in mind that the space S1 still needs to be sufficient. By making the space S2 between the antenna 12 and the glass pane 2 slight, the thickness of the space S2 becomes thin, but the space S2 can function as a heat insulating layer. Even if the thickness of the space S2 is small, a certain amount of gas flows.

On the other hand, when the average thickness Da1 of the fixing portion 13 A is increased, the space S1 is increased (thickened) by that much, so that the gas flow in the space S1 is preferable. However, since the antenna unit 10 protrudes largely from the main surface of the glass pane (1, 2), the antenna unit 10 becomes an obstacle to the glass pane (1, 2). Although the embodiment in which the fixing portion 13 A is provided at two locations of the antenna 12 has been described so far, the mode of the fixing portion 13A is not limited as long as the gas can flow in the space S. The fixing portion may comprises one or several fixing elements and these fixing elements can have another form. According to the invention, the fixing elements 13A can provided at both ends in the X-axis direction of the first main surface of the antenna 12 and at both ends in the Z-axis direction, respectively, and the antenna 12 is fixed to the glass pane with four fixing portions. Further, among the four fixing elements 13A, only one fixing element 13A provided in the −Z axis direction is provided at the lower end of the antenna 12, for example, near the center, and the antenna 12 is fixed to the glass pane (1, 2) by three. It may be fixed by the fixing elements 13A. It is understood that a plurality of small fixing elements can be used instead of long fixing elements.

When the average thickness Da1 of the fixed portion 13A is within the above range, the gas flowing into the space S1 can pass through the space S1 due to a slight increase in temperature. As a result, at least the first glass pane 1 can be prevented from being heated by the gas flowing in the space S1, so that excessive temperature rise of the antenna 12 can be suppressed. The average thickness Da1 or Da2 of the fixing portion 13A is more preferably 2 mm to 16 mm, further preferably 4 mm to 14 mm, and particularly preferably 6 mm to 12 mm and also depending of the distance, D, available to place the antenna unit between the first and the second glass pane.

In the present embodiment, the thickness refers to the length in the vertical direction (Y axis direction) of the fixed portion 13A with respect to the contact surface of the antenna 12 and the glass pane (1, 2). In the present embodiment, the average thickness Da1 or Da2 of the fixed portion 13A is an average value of the thickness of the fixed portion 13A. For example, when measured in several places (for example, about three places) at an arbitrary place in the Z axis direction in the cross section of the fixed part 13A, it means the average value of the thicknesses of these measurement points.

Figure 6:
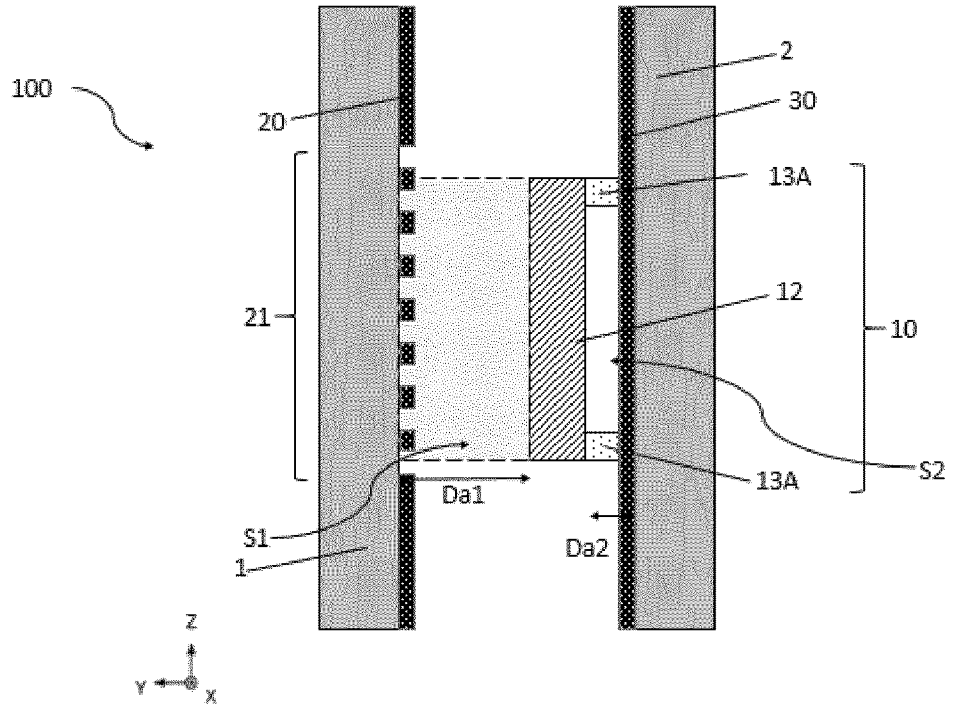
FIG. 6 is a schematic sectional view of an insulating glazing unit according to an exemplifying embodiment of the present invention where the antenna unit is fixed on the coated second glass pane with a coated first glass pane.

As shown in FIG. 4, FIG. 5 and FIG. 6, in order to minimize the heat inside the building and inside the space S and especially inside the space S1 between the antenna 12 and the first glass pane 1, the first glass pane 1 may be partially covered by an insulating coating system. This insulating coating system 20 improves the insulation capacity of the glazing and can minimize the local overheating near the antenna unit. Preferably, the insulating coating system 20 is placed on the inner face of the first glass pane to be more efficient and protected from external conditions such as dust, rain, wind, . . . .

In some embodiments, a coating system can be placed only in the inner surface 2B of the second glass pane 2 to ensure thermal performances of the glazing panel 100.

In these embodiments, preferably, if the antenna is radiation inside (−Y) or in both sides (+Y, −Y), the coating system placed in the inner surface of the second glass pane has an opening in front of the antenna.

As shown in FIG. 6, in ensure a high performance insulating glazing unit a coating system can be placed on the inner surface 1B of the first glass pane 1 and on at least one of the major surface 2A, 2B of the second glass pane 2. And preferably an opening 21 is made on the coating system 20 of the first glass pane 1 in front of the antenna 12.

In a more preferred embodiment, the insulating coating system 20 of the first glass pane has an opening 21 in front of the antenna unit 10. Thereby, the first glass pane can suppress deterioration of the radio wave transmission performance.

When the antenna is radiating on both directions (+Y, −Y), preferably, coating system, on first glass pane and/or on second glass pane, may have an opening.

In some preferred embodiment, to ensure the resistance of material used for the antenna unit, a third glass pane is laminated with the first glass pane 1 with a plastic interlayer especially a PVB interlayer, as PVB interlayer absorbs UV.

The opening 21 can be a surface without the coating system or a plurality of small slits or any shape in the coating layers system to become a frequency selective surface in order to let waves pass from outside to the other side of the glass pane meaning to the antenna and can further suppress deterioration of radio wave transmission performance.

As the coating layers system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

Glass pane can independently be processed, ie annealed, tempered, . . . to respect with the specifications of security and anti-thief requirements.

In addition, the insulating glazing unit 1 can be assembled within a frame or be mounted in a double skin facade or any other means able to maintain a glazing unit.

According to some embodiments according to the invention, the antenna 12 can be a flat plate-like substrate on which the antenna 12 is provided. For instance, the antenna 12 can be a planar antenna like the microstrip patch array, slot array, a dipole antenna, an array of antennas, or the like can be used.

As the metal material forming the antenna 12, a conductive material such as gold, copper, nickel or silver can be used.

According to the invention, the antenna 12 may radiate in the direction of outside (+Y), meaning to the direction of the glass panel, in the direction of inside (−Y), meaning to the opposite direction of the glass panel or in both directions (+Y, −Y).

In some embodiments, the antenna 12 can be provided on a first main surface of the antenna installation substrate. The antenna 12 can be formed by printing a metal material so as to at least partially overlap a ceramic layer provided on the second main surface of the antenna installation substrate. In that embodiment, the antenna 12 is provided on the second main surface of the antenna installation substrate so as to straddle the portion where the ceramic layer is formed and the other portion.

In this embodiment, the ceramic layer can be formed on the second main surface of the antenna installation substrate by a known method such as printing. By providing the ceramic layer, the wiring (not shown) attached to the antenna 12 can be covered or hidden to have a better finish and/or design. Further, in the present embodiment, the ceramic layer is formed on the first main surface but may not be provided.

In the present embodiment, the antenna 12 is provided on the first main surface of the antenna installation substrate, but may be provided inside the antenna installation substrate. In this case, for example, the antenna 12 can be provided inside the antenna installation board in the form of a coil. Further, the antenna 12 itself may be formed in a flat plate shape. In this case, instead of using the antenna mounting board, a flat plate antenna may be directly attached to the fixing portion 13A. The antenna 12 may be provided inside the accommodation container having a surface parallel to the glass pane (1, 2), in addition to being provided on the antenna installation substrate 12. In this case, in the antenna 12, for example, a flat antenna can be provided inside the storage container.

The antenna 12 preferably has optical transparency to be as discrete as possible. If the antenna 12 has optical transparency, the average solar radiation absorption rate can be lowered on top of the hidden effect.

Preferably, the antenna 12 or the antenna installation substrate is provided in parallel to the glass pane (1, 2). The antenna 12 or the antenna installation substrate can be formed in a rectangular shape in a plan view and has a first main surface and a second main surface. The first main surface is provided so as to face the main surface of the glass pane (1, 2) to be attached and the second main surface is provided in a direction opposite to the main surface side of the glass pane (1, 2).

In some embodiments, the material for forming the antenna installation board is designed according to the antenna performance such as power and directivity required for the antenna 12, and for example, glass, resin, metal, or the like can be used. The antenna installation substrate may be formed to have light transmittance by resin or the like. Since the antenna mounting board 12 is made of a light transmissive material, the glass pane (1, 2) can be seen through the antenna installation board 12, so that it is possible to reduce the obstruction of the field of view seen from the glass pane (1, 2).

The thickness of the antenna installation board can be designed according to the place where the antenna 12 is arranged.

As described above, the space S1 is formed between the first glass pane 1 and the antenna 12 by the fixing portion 13A fixed on the first or on the second glass pane (1, 2) and allows gas to flow. Therefore, the thickness of the space S1 is substantially the same as the average thickness Da1 of the fixed portion 13A or the average thickness D minus the average thickness Da2 of the fixed portion 13A minus the average thickness of the antenna.

In the antenna unit 10, gas flows into the space S1 from the lower side (−Z axis direction) of the antenna 12. The gas flowing into the space S1 can freely flow in the space S toward the upper side (+Z axis direction) of the antenna 12. The gas flowing through the space S1 flows out from the upper side (+Z axis direction) of the antenna 12 while contacting the inner surface 1B of the first glass pane 1 at a position facing the antenna 12. By contacting the gas in the space S1 with the inner surface of the first glass pane at a position facing the antenna 12, the outer surface of the first glass pane 1 at the position facing the antenna 12 is exposed to outside gas and the sun excessive temperature rise due to light etc. is suppressed. In addition, since the fixing portion 13A is continuously formed in the vertical direction, the temperature difference between the upper portion and the lower portion in the space S1 is increased accordingly. Therefore, due to the so-called chimney effect, the flow velocity of the gas flowing in the space S1 can be increased. Fixing portion 13A may have at least one hole or fixing portions can comprises small fixing element allowing gas flow to circulate in space S1.

In some embodiments, fixing portion 13A is formed in the horizontal direction. In these embodiments, preferably, holes can be added to fixing portions or fixing portions can comprises small fixing element allowing gas flow to circulate in space S1.

In the antenna unit 10, a fixing portion 13A is provided on the antenna 12 so that a space S1 through which gas can flow is formed between the glass pane (1, 2) and the antenna 12. Thus, even if the first glass pane 1 is heated by outside gas, sunlight, or the like, excessive temperature rise of the main surface of the first glass pane 1 at the position facing the antenna 12 can be suppressed. Therefore, it is possible to reduce the possibility of occurrence of thermal cracks in the glass pane (1, 2) at the position facing the antenna 12. Therefore, the antenna unit 10 can be stably installed on the glass pane (1, 2) without causing damage to the glass pane (1, 2).

In embodiments where a distance Da2 and a space S2 occur, the gas flow can circulate in both sides of the antenna in spaces S1 and S2 then reducing the local overheat of the two glass panes.

Surprisingly, when the distances Da1 and Da2 are sufficient, gas flow is improved between the antenna. Then a improved circulation of gas in the space S between the first and the second glass sheet is created. This improved circulation of gas can improve thermal insulation performances of glazing unit.

The antenna unit 10 is preferably provided at a position separated from the first glass pane 1 by a predetermined distance Da1 or more in plan view. The predetermined distance Da1 is greater than zero and preferably greater than 5 mm, more preferably greater than 10 mm. For example, when the glass sheet is directly exposed to the sunlight, the temperature of the first glass pane 1 rises to a high temperature. In some cases, there is a possibility that thermal cracks may occur in the portion of the glass pane 1 or the vicinity thereof located at the position facing the antenna unit 10. In particular, by attaching the antenna unit 10 to the inner surface of the glass pane (1, 2), the flow of gas on the inner surface 1B of the glass pane 1 at a position facing the antenna unit 10 is hindered. In this case, the temperature of the portion of the glass pane (1, 2) located opposite the antenna unit 10 is further increased. As a result, there is a possibility that the thermal distortion occurring in the portion of the glass pane (1, 2) at the position facing the antenna unit 10 or in the vicinity thereof may be further increased.

The predetermined distance Da1 is more preferably 15 mm, further preferably 20 mm but limited to the distance D available by keeping the insulating glazing unit as thin as possible while keeping performances.

Since the insulating glazing panel 100 is provided with the antenna unit 10, it is possible to reduce the possibility of occurrence of thermal cracks in the portion of the glass pane (1, 2) located opposite the antenna unit 10 while at least keeping thermal insulation properties of the insulating glazing unit 100. Therefore, the insulating glazing unit 100 with an antenna can be suitably used as a glazing unit for a window glass of existing or new buildings, houses and the like.

It is possible to prevent the antenna unit 10 from damaging the external appearance of the building, and it is possible to prevent the antenna unit 10 from being exposed to the outside gas, so that the durability can be improved. Furthermore, in the glazing unit 100 with an antenna, the antenna unit 10 is provided on the upper side of the glass pane (1, 2) and on either one of the left and right sides or at least near the edge of the glazing unit. Therefore, by passing the wiring connected to the antenna of the antenna unit 10 from the glass pane to the ceiling back side, the wall, etc., it is possible to reduce the number of wires exposed to the glazing unit 100 and the wall inside the building interior it can.

Antenna connections and wires can pass through the spacer while keeping the gas tightness of the glazing unit by known methods, or can be coupled with external to the glazing unit wires or by any other known method to power or transmit information from outside to inside or from inside to outside of a glazing unit.

Further, since the antenna unit 10 is provided on the glass pane (1, 2), there is no need to provide the glass pane (1, 2) with the antenna on the roof of the building or the like. Therefore, since the glass pane (1, 2) with an antenna can be made unnecessary for installation at a high place such as the roof of a building, it can be easily installed in a building.

The invention claimed is:

1. An insulating glazing unit, extending along a plane defined by a longitudinal axis and a vertical axis; having a width measured along the longitudinal axis, and a length measured along the vertical axis, comprising:

- a first glass pane, facing outside having two major surfaces extending along the plane, the two major surfaces being an outer surface and an inner surface;
- a second glass pane facing inside having two major surfaces extending along the plane, the two major surfaces being an outer surface and an inner surface facing the inner surface of the first glass pane;
- a spacer, maintaining a distance between the first glass pane and the second glass pane; and
- an antenna unit comprising an antenna,
- wherein the antenna unit is fixed between the first glass pane and the second glass pane, and
- wherein the antenna unit comprises
  - the antenna, and
  - a fixing portion for fixing the antenna to one of the first and second glass panes and for maintaining the antenna at a first distance from the inner surface of the first glass pane to create a first space between a first side of the antenna and the inner surface of the first glass pane through which gas can circulate and for maintaining the antenna at a second distance from the inner surface of the second glass pane to create a second space between a second side of the antenna and the inner surface of the second glass pane through which the gas can circulate such that the gas can circulate all around the antenna.

2. The insulating glazing unit according to claim 1, wherein the first glass pane is at least partially covered by an insulating coating system.

3. The insulating glazing unit according to claim 2, wherein the insulating coating system is placed on the inner surface of the first glass pane.

4. The insulating glazing unit according to claim 2, wherein the insulating coating system of the first glass pane has an opening in front of the antenna unit.

5. The insulating glazing unit according to claim 1, wherein the second glass pane is at least partially covered by a coating system.

6. The insulating glazing unit according to claim 5, wherein the coating system of the second glass pane has an opening in front of the antenna unit.

7. The insulating glazing unit according to claim 5, wherein the second glass pane is at least partially covered by an insulating coating system.

8. The insulating glazing unit according to claim 1, wherein the fixing portion is fixed to the first glass pane.

9. The insulating glazing unit according to claim 1, wherein the fixing portion is fixed to the second glass pane.

10. The insulating glazing unit according to claim 1, wherein the first distance is greater than the second distance.

* * * * *